(12) United States Patent
Chouinard et al.

(10) Patent No.: US 7,160,514 B2
(45) Date of Patent: Jan. 9, 2007

(54) SLIDE CASE WITH REMOVABLE RACK

(75) Inventors: Richard J. Chouinard, Dover, NH (US); N. Guy Cosby, Madbury, NH (US); David J. Moore, Portsmouth, NH (US)

(73) Assignee: Erie Scientific Company, Portsmouth, NH (US)

( * ) Notice: Subject to any disclaimer, the term of this patent is extended or adjusted under 35 U.S.C. 154(b) by 588 days.

(21) Appl. No.: 10/024,269

(22) Filed: Dec. 18, 2001

(65) Prior Publication Data

US 2003/0111373 A1   Jun. 19, 2003

(51) Int. Cl.
*B01L 9/00* (2006.01)

(52) U.S. Cl. .......................... 422/104; 422/49; 422/99; 422/100; 422/101; 422/102; 422/300; 211/40; 211/41.18; 206/307.1; 206/733; 206/754

(58) Field of Classification Search ................ 422/243, 422/297, 104, 272, 300, 100, 49.99; 206/710, 206/45.33, 307.1, 733, 754; 232/39; 211/40, 211/40.18; 436/180
See application file for complete search history.

(56) References Cited

U.S. PATENT DOCUMENTS

| | | | |
|---|---|---|---|
| 3,960,268 A | 6/1976 | Davis et al. | |
| 4,481,246 A | 11/1984 | Melisz et al. | |
| 4,679,914 A | 7/1987 | Rosenberg | |
| 5,021,218 A | 6/1991 | Davis et al. | |
| 5,340,551 A | 8/1994 | Berry, Jr. | |
| 5,571,721 A | 11/1996 | Turner | |
| 5,736,102 A * | 4/1998 | Seaton et al. ................. | 422/65 |

FOREIGN PATENT DOCUMENTS

JP   52 118390 A   10/1977

\* cited by examiner

*Primary Examiner*—Jill Warden
*Assistant Examiner*—Jyoti Nagpaul
(74) *Attorney, Agent, or Firm*—Wood, Herron & Evans LLP

(57) ABSTRACT

A rack for holding specimen slides. The rack has a frame with opposed support bars having opposed openings for supporting opposite ends of the specimen slides. The support bars have edges connected to sides of the frame, so that the support bars are resiliently deflectable with respect to the frame. The rack of specimen slides is containable in a slide case for purposes of transportation. The slide case has a base with a first latch portion, and the rack has a second latch portion. As the rack is positioned adjacent the base, the first and second latch portions are placed in juxtaposition to releasably secure the rack in the base. A cover is positionable over the base such that the base and cover fully enclose the rack of specimen slides. As the cover is closed over the base, the cover pushes the specimen slides against the opposed support bars, thereby deflecting the support bars and securing the specimen slides in the slide case.

13 Claims, 3 Drawing Sheets

SLIDE CASE WITH REMOVABLE RACK

FIELD OF THE INVENTION

This invention relates generally to a container for storing specimen slides and, more particularly, to an improved container for storing and transporting specimen slides.

BACKGROUND OF THE INVENTION

There are known storage containers for the bulk storage of frangible sheet material, such as specimen slides. Known containers often have opposed pairs of slots separated by a fixed distance for receiving the slides, and such storage containers have proven satisfactory for storing slides. However, the slides are often subjected to various processes, for example, dipping in liquids and preprocess drying in a centrifuge, but the known storage containers are not suitable for use in such processing. Therefore, the slides must be removed from the storage containers and transferred to other racks that can be used with the preprocessing machines.

In other situations, the slides must be shipped to another location. Known bulk storage containers are not able to protect the slides from the rigors of commercial shipping and transportation that are widely used to ship other items. Therefore, the slides must be removed from the bulk storage container and repackaged for shipment. Such special handling is not cost effective in most commercial environments. Thus, the repeated handling of each individual slide required by known bulk storage containers adds substantial cost to processes to which the slide is subjected.

Consequently, there is a need for a bulk storage container that overcomes the disadvantages of known slide storage containers discussed above.

SUMMARY OF THE INVENTION

The present invention provides a slide storage system that is simple in construction, flexible and durable in use. The slide storage system of the present invention secures the slides so that they do not chip in their supports, and the storage system is sufficiently durable that it can be used to transport the slides. Further, the storage system has a structure permitting slides to be processed while contained within the storage system. Thus, by substantially reducing the need and associated costs of removing and reloading the slides, the slide storage system of the present invention is especially useful in environments where slides are subjected to preprocessing and/or where the slides must be transported to another location.

According to the principles of the present invention and in accordance with the described embodiments, the invention provides a rack for holding specimen slides. The rack has a frame with a first support bar having an opening adapted to support one end of a specimen slide. The first support bar has a first edge connected to a first side of the frame, so that the first support bar is movable with respect to the frame.

In one aspect of this invention, the rack has a second support bar disposed in the frame substantially parallel to the first support bar. The second support bar has an opening for supporting an opposite end of the specimen slide and a first edge connected to an opposite side of the frame, so that the second support bar is movable with respect to the frame.

In another embodiment of the invention, a slide case is provided for holding and transporting specimen slides. The slide case has a base having a first latch portion and a rack positionable adjacent the base with a second latch portion. As the rack is positioned adjacent the base, the first and second latch portions are placed in juxtaposition to releasably secure the rack in the base. A cover is positionable over the base such that the base and cover fully enclose the rack.

In one aspect of this invention, one of the first and second latch portions is a projecting detent and the other latch portion is a recess. The latch being formed by the projecting detent being captured in the recess. In another embodiment of this invention, the cover has a rib that engages upper edges of the slides upon the cover being placed on the base. As the cover is fully engaged, the slides are pushed against a cantilevered support to slightly deflect the support and securely capture or clamp the specimen slides within the slide case. So secured, the case of specimen slides may then be shipped using commercial carriers without breaking or chipping the specimen slides.

In another embodiment of the invention, a method is provided for inserting specimen slides into opposed supports, one of the supports having one edge attached to, and being movable with respect to, one side of a rack. Next, the rack holding the specimen slides is inserted into a base; and a cover is placed over the base so that the cover contacts upper edges of the specimen slides. As the cover is further moved toward the base, the cover simultaneously pushes the specimen slides against the one of the supports so that the one of the supports deflects, thereby securing the specimen slides in the slide case between the cover and the one of the supports.

These and other objects and advantages of the present invention will become more readily apparent during the following detailed description taken in conjunction with the drawings herein.

DETAILED DESCRIPTION OF THE INVENTION

Figure 1:
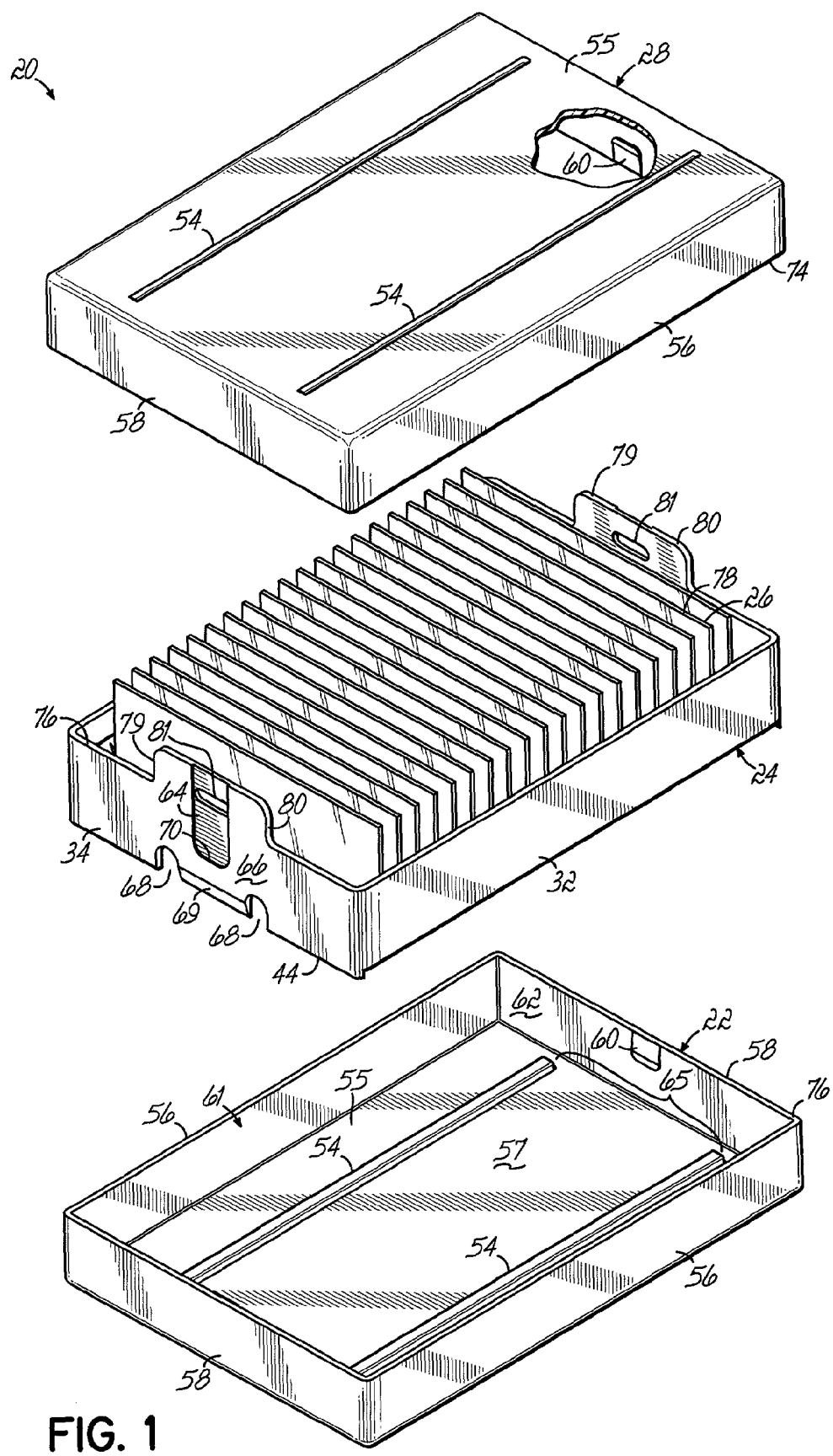
FIG. 1 is a disassembled perspective view of a slide case in accordance with the principles of the present invention.
Figure 2:
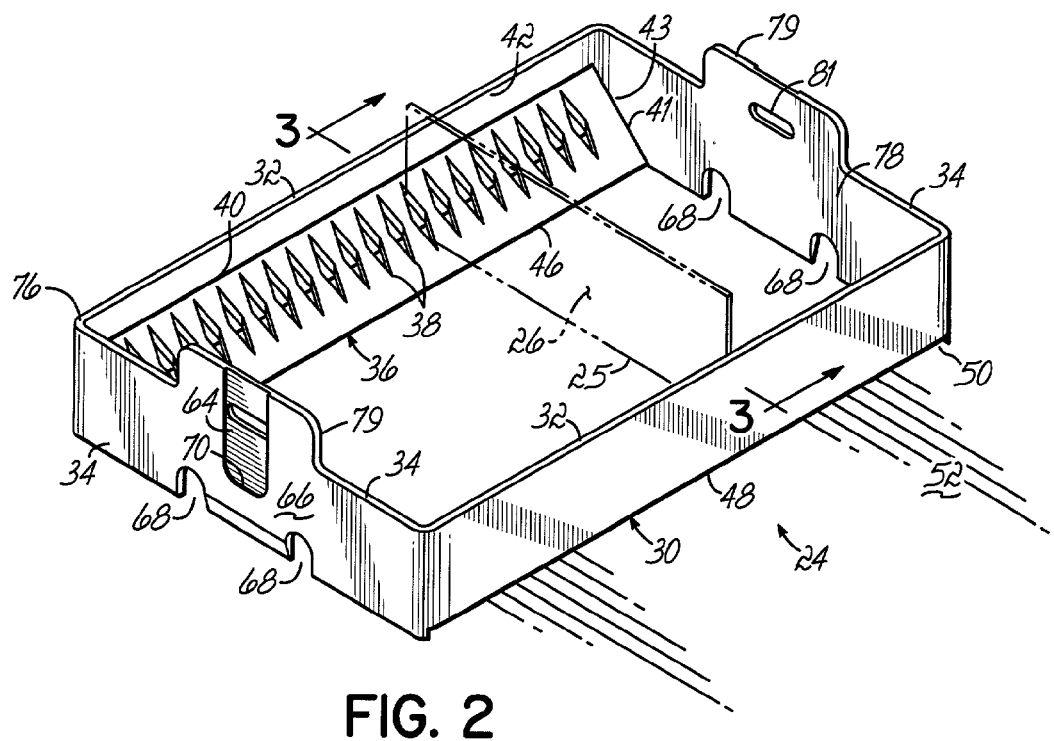
FIG. 2 is perspective view of a slide rack used with the slide case of FIG. 1.

Referring to FIG. 1, a slide case 20 is comprised of a lower case or base 22 that removably receives and supports a slide rack 24. The rack 24 individually supports and stores a plurality of flat, planar, rectangular slides 26, for example, glass specimen slides often used in laboratories. To facilitate picking up and carrying the rack 24, the rack 24 has handles 79 formed by upward extending tabs 80 and holes 81. An upper case or cover 28 fits over the slide rack 24 and when secured, abuts against the base 22, thereby providing the enclosed slide case 20. Referring to FIG. 2, the rack 24 has a quadrilateral frame 30 with two opposed longitudinally extending side walls 32 and opposed end walls 34. The rack 24 has no bottom or lower wall, and thus, fluids are able to pass through the rack 24. Two opposed support bars 36 are rigidly connected to the sides 32. The support bars 36 have a series of generally diamond shaped openings 38, and each of the openings 38 provides a subjacent support at one end of a lower edge 25 of a slide 26 shown in phantom. The diamond shape of the openings 38 minimizes contact between the slides 26 and the support bars 36.

Figure 3:
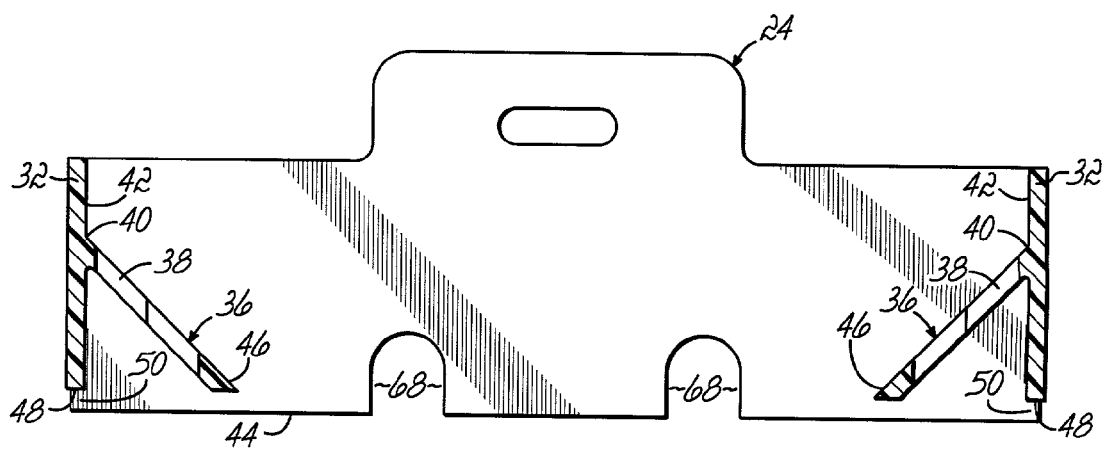
FIG. 3 is a cross-sectional view taken along line 3—3 of FIG. 2 and illustrates an end view of the slide rack.
Figure 4:
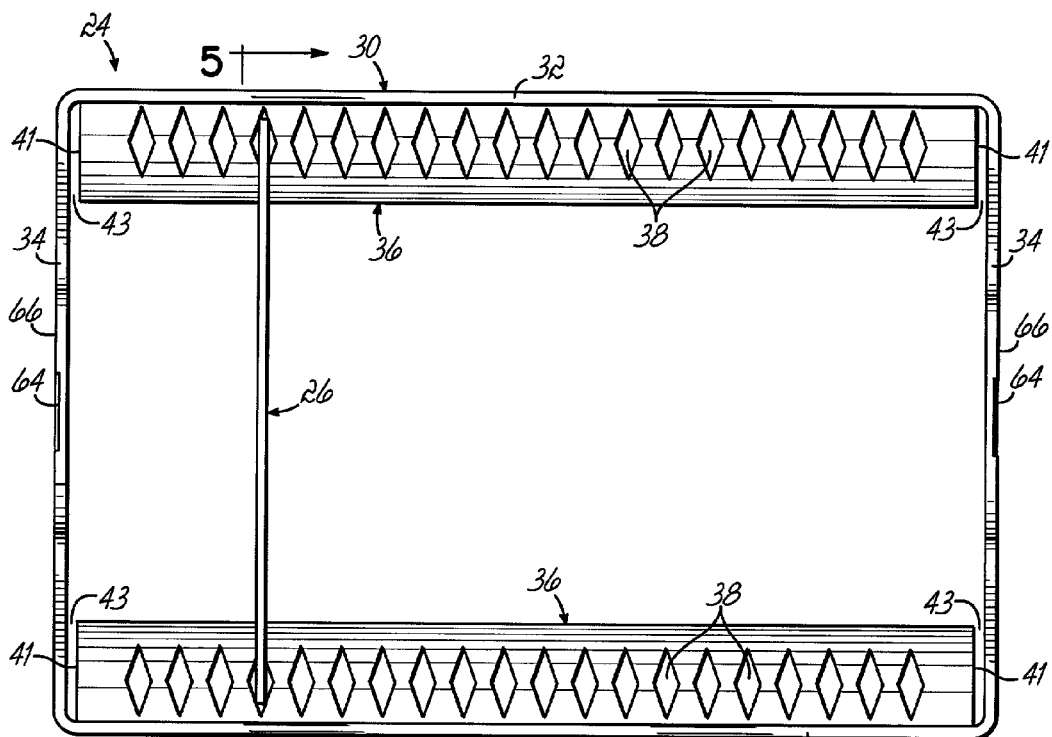
FIG. 4 is a top plan view of the slide rack of FIG. 2.

Referring to FIGS. 3 and 4, each of the support bars 36 has an upper edge 40 that is rigidly connected to an inside surface 42 of the rack sides 32. However, the ends 41 of the support bars 36 do not extend to or contact the end walls 34, so that there is a small space 43 between the support bar ends 41 and the rack end walls 34. Thus, the support bar upper edge 40 is the only connection of the support bar 36 to the rack 24; and hence, the support bars 36 are cantilevered from the side walls 32. The support bars 36 extend angularly inward and downward from respective side wall inside surfaces 42 toward a bottom edge 48 of the side walls 32. Further, each of the support bars 36 is movable or resiliently deflectable in response to a downward force to a distal end 46 of a respective support bar 36.

The ends 34 of the rack 24 have a greater height than the sides 32; and therefore, the lower edges 44 of the ends 34 extend below the lower edges 48 of the sides 32. Thus, an opening or space 50 is provided over a length of the sides 32 between the side lower edge 48 and a plane defined by the lower edges 44 of the ends 34.

Referring to FIG. 1, the base 22 and cover 28 are substantially identical in construction. The base 22 and cover 28 may have different labeling either molded in or applied thereto. Each of the base 22 and the cover 28 has a major containment wall 55 with side walls 56 and end walls 58 extending around a periphery of the wall 55, thereby defining a cavity 61. Further, each of the base 22 and cover 28 has a pair of spaced apart ribs 54 disposed on an inner surface 57 within the cavity 61. The ribs 54 extend lengthwise in a direction substantially parallel to the sides 56 and substantially perpendicular to the ends 58; and therefore, when a rack 24 of slides 26 is mounted in the case 20, the ribs 54 are substantially perpendicular to planes of the slides 26. Further, each of the base 22 and cover 28 has a first latch portion 60, for example, a projection or detent, extending inwardly from an inner surface 62 of each of the end walls 58. The rack 24 has a second latch portion 64, for example, a dimple or recess, disposed on an outer surface 66 of each of the end walls 34.

Figure 6:
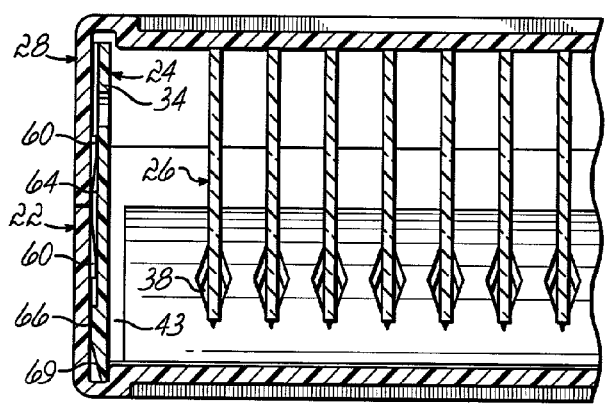
FIG. 6 is a centerline cross-sectional view of an end of the assembled slide case that illustrates the slide rack latch.

The rack ends 34 have arched openings or notches 68 that reduce their stiffness and provide the rack ends 34 with some resiliency. Therefore, as the rack 24 is placed into the base 22, the rack ends 34 and/or the base ends 58 deflect slightly so that projections 60 ride over respective rack end surfaces 66 until the projections 60 snap into respective recesses 64. With the projections 60 disposed in the recesses 64 as shown in FIG. 6, the rack 24 is now securely mounted in, and partially enclosed by, the base 22. There is sufficient clearance 65 between the ends of the ribs 54 and the rack ends 34 so that the lower edges 44 of the rack ends 34 rest directly on the inner surface 57 of the base wall 55. Each rack end 34 has a lower edge segment 69 that is slightly beveled downward and inward from an end wall outer surface 66 to a lower edge 44, so that the first latch portion or detent 60 more readily slides over the outer surface 66 toward the second latch portion or recess 64.

Figure 5:
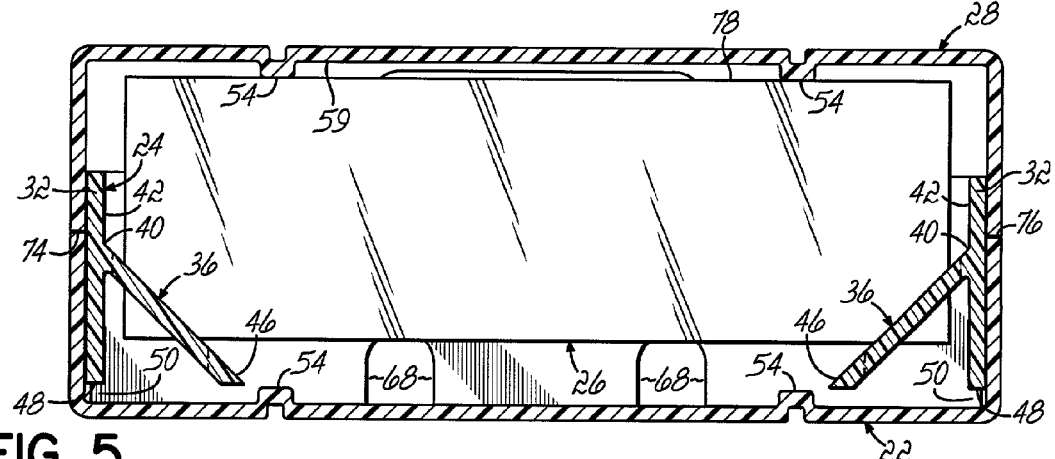
FIG. 5 is a cross-sectional end view of the assembled slide case of FIG. 1.

With the rack 24 mounted in the base 22, the cover 28 is aligned with the base 22 and placed over the rack 24 and slides 26. The cover 28 is moved toward the base 22 while maintaining its alignment with the base 22. Referring to FIG. 5, as a lower peripheral edge 74 of the cover 28 approaches, but before it contacts, an upper peripheral edge 76 of the base 22, the ribs 54 on a cover inner surface 59 contact upper edges 78 of the slides 26. In this embodiment, when the cover lower edge 74 is approximately 0.005 inches from the base upper edge 76, the ribs 54 contact the slide upper edges 78. As the cover 28 is further moved toward the base 22, the force of the ribs 54 contacting the slide upper edges 78 causes the resiliently cantilevered support bars 36 to deflect slightly downward toward the lower edge 48 of the rack side walls 32. The cover 28 is further moved until the cover lower edge 74 contacts the base upper edge 76, thereby limiting the force applied to the slide upper edges 78 and the deflection of the support bars 36. With the cover 28 fully closed on the base 22, the slides 26 are clamped or secured between the cover ribs 54 and the support bars 36 of the rack 24.

When the cover 28 is moved away from the base 22, the cover ribs 54 lose contact with the slide upper edges 78; and the support bars 36 move away from the lower edge 48 of the rack side walls 32 and return to their original, unloaded and undeflected position. The rack 24 can be removed from the base 22 by either, direct manual manipulation or, a carrier can be inserted into the holes 81 and used to lift the rack 24 from the base 22. To remove the rack 24 from the base 22, the upper extending tabs 80 (FIG. 1) on the rack ends 34 are pressed inward toward each other. The size of notches 68 determines the force necessary to slightly warp or bend the rack ends 34. The tabs 80 are pressed inward until the lower edges 70 of respective recesses 64 are clear of respective projections 60, and the rack 24 is moved out of the base 22. In that process, the lower edges 70 of the recesses 64 move past the latch projections 60 on the base 22, thereby unlatching the rack 24 from the base 22. It should be noted that the base 22 and cover 28 serve different functions, but they are substantially identical in construction. Therefore, as will be appreciated from the above description, the ribs 54 on the base 22 and the first latch portion 60 of the cover 28 (FIG. 1) serve no purpose.

The base 22, rack 24 and cover 28 are normally molded from a high density polyethylene material. However, as will be appreciated, those parts may be made of polypropylene, polycarbonate or any other plastic material that does not outgas. As will be appreciated, the parts can be made of other materials that are suitable for the intended use. The base 22, rack 24 and cover 28 are often made to be opaque in order to protect the slides from the adverse effects of light, if any.

In use, the supplier of the slides cuts the slides to the desired size, and cleans and dries them. Often, the glass slides are used as specimen slides to hold and/or store samples of DNA. In those applications, the supplier of the glass slides may coat the specimen slides in a liquid or vapor deposition process in which a DNA binding chemical provides the desired coating. The specimen slides 26 are loaded in the rack 24; and using the handles 79, the rack 24 is placed in a base 22. The latching members 60, 64 secure the rack 24 in the base 22 as previously described. Next, the cover 28 is placed on the base 22 and the case 20 filled with slides 26 is vacuum sealed in a barrier bag, for example, an aluminum foil bag, so that the cover 28 is held firmly against the base 22. With the cover 28 firmly closed against the base 22, the slides 26 are clamped within the case 20; and the sealed case with the slides may be shipped to a customer using known commercial carriers.

When received by a customer, for example, a DNA laboratory, the vacuum package is opened and the cover 28 is removed. The rack 24 with the slides 26 may then be removed from the base by depressing the ends 34 to release the latch members 60, 64. Either, the handles 79 or a carrier (not shown) inserted into the handle holes 81, is used to pull the rack 24 from the base 22 and carry the rack 24 from one location to another. It should be noted that there are numerous procedures for processing the slides in the rack 24. The following are only a few examples of the processing options. If desired, the customer is able to preprocess the specimen slides while still in the rack 24. In this example, the rack 24 with the specimen slides 26 is dipped in one or more liquids. Thereafter, the excess liquid is removed in a centrifuge. Prior to being placed in the centrifuge, the rack 24 is reinserted in a base 22. The base may be the same one that was used to ship the rack 24. Alternatively, it may be desirable to keep that base clean, and a different base can be used to hold the rack while in the centrifuge. After drying, the slides are often removed from the rack and placed in other equipment to be spotted, hybridized and scanned. If at any time during those processes, it is necessary to store the slides, they can again be placed in the rack 24. The rack is than placed in the base 22, and the cover 28 is placed on the base 22 to form a closed case 20. As will be appreciated, the cover 28 can be temporarily secured on the base by a surrounding tie or band, or the case can again be placed in a vacuum sealed package. The case can also be placed in the barrier bag in which it was received by the customer.

The slide case 20 has a structure permitting slides to be preprocessed while contained within the rack 24. Further, when the cover 28 is applied over the base 22, the slides 26 are immobilized in the slide case 20. That immobilization in combination with the durability of the slide case 20 make it a suitable container for transporting the slides using commercial carriers. Thus, by substantially reducing the need and associated costs of removing and reloading the slides, the slide case 20 with the rack 24 is especially useful in environments where slides are subjected to preprocessing and/or where the slides must be transported to another location. As will be appreciated, the ability to process batches of slides in a rack 24 by the slide supplier as well as the customer, represents a substantial opportunity for cost savings. Further, the substantially identical structure of the base 22 and cover 28 permits both parts to be made from a single mold, thereby substantially reducing the cost of the molds needed to manufacture the case 20.

While the invention has been illustrated by the description of one embodiment and while the embodiment has been described in considerable detail, there is no intention to restrict nor in any way limit the scope of the appended claims to such detail. Additional advantages and modifications will readily appear to those who are skilled in the art. For example, in the described embodiment, the ribs 54 contact the slide upper edges 78 with an about 0.005 inch spacing between the cover lower edge 74 and the base upper edge 76. As will be appreciated, the spacing may vary depending on the size of the slides 26 and the case 20, the resiliency of the support bars 36, the desired securing force to be applied to the slide top edges 78, etc.

In the described embodiment, the ribs 54 are shown as being of a continuous length and substantially parallel to the sides 32. However, as will be appreciated, in an alternative embodiment, the ribs may take the form of any shaped projections that are positioned so that they contact the slide upper edges. Further, the ribs 54 or other projections can be continuous or discontinuous and oriented in any direction on the wall 55 of the cover 28, for example, the ribs can extend diagonally from corner to corner. In addition, while two ribs 54 are shown, in an alternative embodiment, only one rib can be used. In a still further embodiment, the ribs 54 can be eliminated and the inside surface of the wall 55 of the cover 28 used to contact the slide upper edges 78.

In the described embodiment, the latch between the rack 24 and the base 22 is comprised of a projection on the base end wall 58 and a recess on the rack end wall 34. As will be appreciated, in an alternative embodiment, the location of those parts can be reversed with the projection being on the rack end wall 34 and the recess being on the base end wall 58. In other embodiments, other latch mechanisms may be used, for example, the base may have a resilient finger that extends over an upper edge 76 of the rack end walls 34. While a latch is shown at the ends of the rack 24, in alternative embodiments, one or more latches may be operative with the rack sides 32 or a combination of the rack ends and sides. In further embodiments, fewer or more than two latches may be used to secure the rack 24 in the base 22.

In the described embodiment, the sides 32 have a lesser height than the ends 34; and thus, a passage or space 50 for fluid drainage exists beneath the sides 32. As will be appreciated, in alternative embodiments, the space 50 may be provided under only one of the sides walls 32 or under one or both of the end walls 34.

In addition, while the illustrated embodiment shows a case of a particular size for a particular number of slides; as will be appreciated, the claimed invention is applicable to a case of any size for any number of slides. Further, in the illustrated embodiment, both of the support bars 36 are described as being cantilevered from a side wall 32 by having only one edge connected to the side wall. Further, the diamond shaped openings in the support bars 36 may be replaced by any shaped hole or opening that supports the slides 26 in a desired manner.

As will be appreciated, in an alternative embodiment, only a single movable support bar 36 can be used to support one end of the specimen slide and a fixed support is used to support the opposite end of the specimen slide. The fixed support can be a fixed support bar or other fixed supports such as V-shaped notches or slots molded on the inside surface of a rack side 32. With this embodiment, it may be desirable to mount the fixed support at a slightly lower elevation on a rack side wall 32, such that when the slide is mounted in the rack and the cover is on the base, thereby deflecting the movable support bar, the slide is squarely supported with respect to the case.

Therefore, the invention in its broadest aspects is not limited to the specific details shown and described. Consequently, departures may be made from the details described herein without departing from the spirit and scope of the claims which follow.

What is claimed is:

1. A slide case for holding and transporting at least one slide, the slide case comprising:
   a rack comprising
   four substantially planar walls having respective ends rigidly connected together,
   lower edges adapted to support the rack on a surface,
   a first support bar connected only to one of the walls and comprising
   a first longitudinal edge extending over a length of, and connected to, an inner surface of the one of the walls to cantilever the first support bar from the one of the walls,
   a second longitudinal edge being deflectable with respect to the one of the walls and being spaced away from the lower edges of the rack; and
   a first opening adapted to support one end of a slide, and
   a second support bar connected to only another one of the walls and comprising a third longitudinal edge extending over a length of, and connected to, an inner surface of the other one of the walls to cantilever the second support bar from the other one of the walls, a fourth longitudinal edge being deflectable with respect to the other one of the walls and being spaced away from the lower edges of the rack, the four walls defining an interior space within which the first support bar, the second support bar and the slide are located, the space comprising no rack structure between a plane defined by the second longitudinal edge and the fourth longitudinal edge, the four walls and a plane defined by the lower edges of the rack; and a second opening disposed opposite the first opening and adapted to support an opposite end of the slide, the rack is usable for supporting the ends of the slide outside of the slide case prior to, during and after a slide processing operation;

a base comprising four walls connected to a bottom, the rack being removably positionable in the base; and a cover having a projection on an inner surface and being positionable on the base, the projection on the cover adapted to press against the slide and deflect the support bars, thereby securing the slide between the rack and the cover during transportation of the slide.

2. The slide case in accordance with claim 1 wherein each of the first and second support bars angles downward from a respective inner surface toward the lower edges of the rack, each of the first and second support bars forming an included acute angle with the respective inner surface and comprising respective ends that are spaced away from the walls.

3. The slide case in accordance with claim 1 further comprising a plurality of first and second openings in the respective first and second support bars for holding and transporting a plurality of slides, each of the openings being substantially diamond shaped with two opposed corners of the diamond shape defining a line substantially perpendicular to a first edge of a respective one of the first and second support bars.

4. The slide case in accordance with claim 1 wherein the lower edges of opposed ends of the rack comprise a lowermost boundary of the rack, and opposed sides of the rack comprise respective lower edges above the lowermost boundary of the rack.

5. The Slide case in accordance with claim 1 further comprising:

a first latch portion disposed on the base; and a second latch portion disposed on a first wall of the rack such that upon positioning the rack within the base, the first and second latch portions are placed in juxtaposition to releasably secure the rack in the base.

6. The slide case in accordance with claim 5 wherein the first latch portion comprises a detent disposed on a wall of the base, the second latch portion comprises a recess disposed in the first wall, and the first wall is deflectable to permit the detent to be moved with respect to the recess between latched and unlatched positions.

7. The slide case in accordance with claim 1 wherein the projection comprises at least one rib extending substantially perpendicular to a plane of the slide.

8. The slide case in accordance with claim 1 wherein the rack further comprises first and second holes, each hole extending through a different one of the walls to facilitate picking up and carrying the rack.

9. The slide case in accordance with claim 1 further comprising a bag containing the cover positioned on the base containing the rack.

10. The slide case in accordance with claim 9 wherein the bag comprises a vacuum sealed barrier bag.

11. The slide case in accordance with claim 9 wherein the bag comprises an aluminum foil bag.

12. An apparatus for holding a plurality of slides during both a slide processing operation and transportation of the slides, the apparatus comprising:

a rack comprising four substantially planar walls having respective ends rigidly connected together, lower edges adapted to support the rack on a surface, substantially planar support bars, each of the support bars being connected to a different one of the walls and comprising a first longitudinal edge extending over a length of and connected to, an inner surface of one wall to cantilever the support bar from the one wall, a second longitudinal edge being deflectable with respect to the first longitudinal edge and the walls of the rack, the second longitudinal edge being spaced away from the lower edges of the rack, and a plurality of openings located between the first longitudinal edge and the second longitudinal edge and adapted to support ends of respective slides, the four walls defining an interior space within which the planar support bars and the slides are located, the space comprising no rack structure between a plane defined by the second longitudinal edge of respective support bars, the four walls and a plane defined by the lower edges of the rack, and the rack useable to support the slides, prior to, during and after a slide processing operation;

a base comprising four substantially mutually perpendicular planar walls connected to a bottom comprising an inner directed surface, the rack being removably positionable in the base with the walls of the rack being immediately adjacent to, and substantially parallel to, the walls of the base; and a cover having a projection on an inner surface and being positionable on the base, the projection on the cover pressing against the slides, thereby securing the slides in the rack during transportation of the slides, the rack supporting the slides during both a slide processing operation and transportation of the slides.

13. The apparatus of claim 12 wherein each of two opposed walls of the rack comprises a handle portion to facilitate lifting, carrying and placement of the rack supporting the slides.

* * * * *